Aug. 8, 1944.     G. A. TINNERMAN     2,355,485
FASTENING DEVICE
Filed June 4, 1942
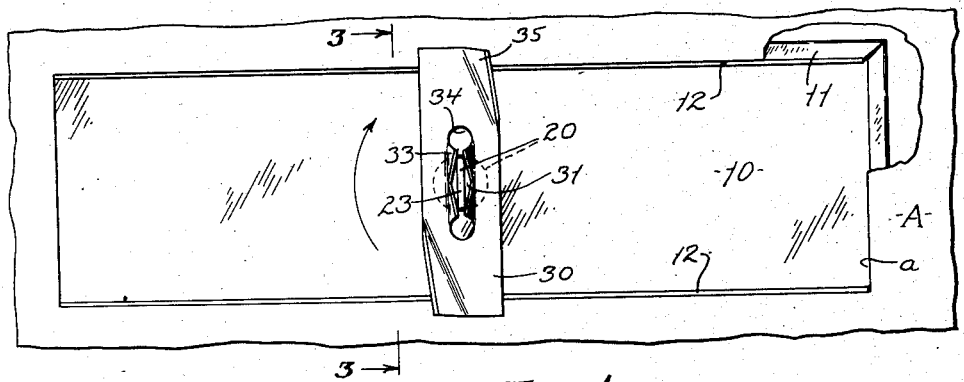
FIG. 1
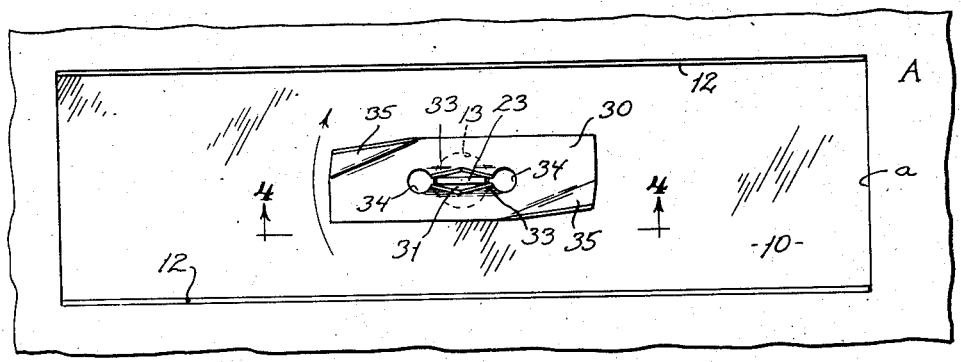
FIG. 2
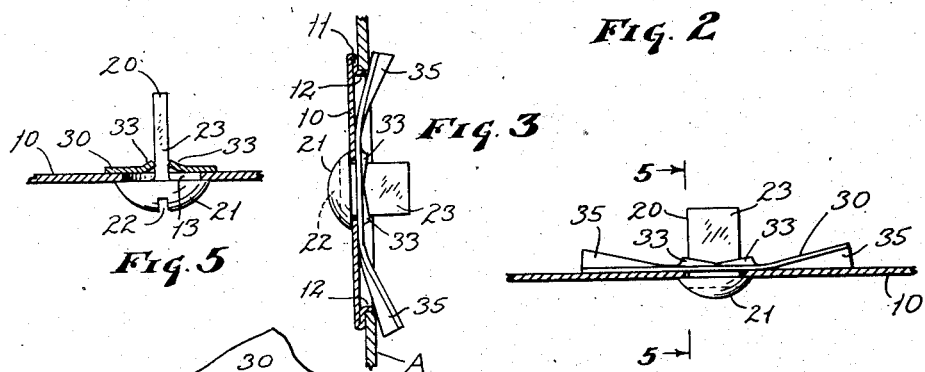
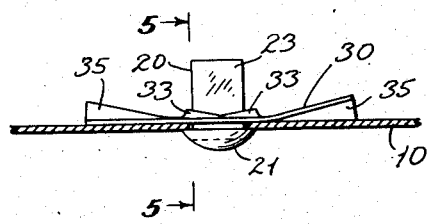
FIG. 4
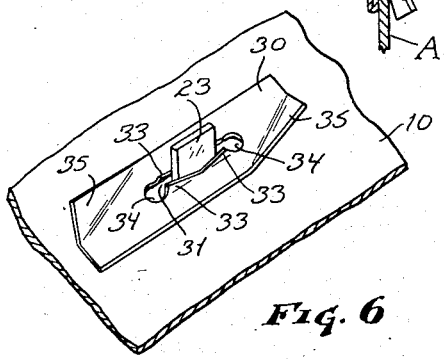
FIG. 6
Inventor
George A. Tinnerman,
By Bates, Teare & McKean
Attorneys.

Patented Aug. 8, 1944

2,355,485

UNITED STATES PATENT OFFICE 2,355,485

FASTENING DEVICE

George A. Tinnerman, Cleveland, Ohio, assignor to Tinnerman Products, Inc., Cleveland, Ohio, a corporation of Ohio Application June 4, 1942, Serial No. 445,711

1 Claim. (Cl. 292—218)

This invention relates to a removable inspection plate adapted to be mounted as a closure for an opening in a suitable support and provided with a simple fastening for locking in place. The fastening mentioned comprises a stud rotatably mounted in the inspection plate projecting to the rear thereof and a bar mounted on the stud and adapted to be turned thereby into position to overlap the margins of the frame on opposite sides of the inspection plate and thereby hold the inspection plate in position.

In its preferred form the inspection plate has a marginal flange adapted to enter the opening and position the plate. The cross bar on the inner side of the plate is a sheet metal member having an opening through which the stud may extend and spring tongues formed from the body of the bar engage the sides of the stud, which is flat in this region, so as to lock the plate to the stud. Diagonally opposite corners of the bar are bent away from the plate, so that they may readily ride over the margins of the support. This preferred form of my invention is illustrated in the drawing and hereinafter explained in detail.

In the drawing, Fig. 1 is a rear elevation of a suitable support, wall or panel having my inspection plate mounted therein in locked position, a portion of the support being broken out to disclose the marginal flange on the plate; Fig. 2 is an elevation looking at the rear or inner face of the inspection plate, showing the bar in unlocked position ready to be turned to lock the plate; Fig. 3 is a vertical cross section in a plane indicated by the line 3—3 on Fig. 1; Fig. 4 is a horizontal cross section in a plane indicated by the line 4—4 in Fig. 2; Fig. 5 is a fragmentary section through the inspection plate and fastening bar, as indicated by the line 5—5 on Fig. 4; Fig. 6 is a perspective of the fastening device, looking at the inner face of the inspection plate.

In Figs. 1 and 2, A represents a suitable support which may, for instance, be an instrument board or partition wall in a vehicle or the wall of any compartment or a receptacle, which has an inspection opening indicated at $a$. This opening is shown as rectangular and is preferably large enough to admit the operator's hand and thus permit repairs or adjustment of parts behind the opening as well as inspection thereof. 10 in each of the views indicates a closure plate adapted to be mounted in and across the opening $a$. As shown, this comprises a rectangular sheet metal plate having its opposite edges bent back on the rear face of the plate, as shown at 11 in Figs. 1 and 3, and then flanged rearwardly at right angles to the plate, as indicated at 12. The two opposite flanges 12 by engaging the top and bottom edges of the opening A and extending from one end of the opening to the other, as shown in Fig. 2, serve to position the plate against shifting in its own plane.

Mounted in the plate 10, preferably at the center thereof, in a manner to enable at least a quarter turn, is a stud 20. This stud is shown as having a half round head 21 on the outer side of the plate provided with a screw driver slot 22, while extending rearwardly from the head is a flat shank 23. The opening 13 in the plate 10, which the shank occupies, may be circular and slightly larger in diameter than the width of the shank 23. Accordingly, the shaft cannot shift materially bodily in the opening, but may rotate therein.

On the inner side of the plate is the fastening bar 30 mounted on the shank 23. This bar is of sheet metal and has a central elongated opening 31 through which the shank 23 extends while the metal on the bar on opposite sides of the opening provides inclined tongues 33 which bite into the opposite sides of the stud.

More specifically in making the bar 30, I pierce it by two round openings 34 connected by a longitudinal slit which widens intermediately so as to produce a very narrow diamond-shaped opening. This leaves V-shaped tongues 33 on opposite sides of the opening which are bent up at an angle to the plane of the bar, as illustrated in Fig. 5. Such a bar may be readily mounted on a flat stud 23 by simply applying pressure on the bar toward the plate 10 until the bar engages the rear face of the plate 10. In this position the bar is locked to the stud by reason of the tongues so that the rotation of the stud (for instance by a screw driver entering the slot 22) may turn the fastening bar correspondingly.

Two of the diagonally opposite corners of the bar are bent up obliquely, as shown at 35, so that the bar may readily ride over the marginal edge of the frame A, when it is turned in the direction of the arrow in Fig. 2 from the position there shown to the position of Fig. 1.

It will be seen that my fastening device is of extremely simple construction comprising merely the rotatable stud and the locking bar applied to the closure plate. The tongue formation of the bar locks it to the stud, and the normal friction between the bar and closure plate, or between the bar and supporting wall, retains the bar in any position given it by the stud. Accordingly, before mounting the plate the bar may stand in about the position shown in Fig. 2. Then, when the plate is manually positioned at the opening in the frame, the application of the screw driver to the stud 21, giving it a quarter turn, carries the bar into the position shown in Fig. 1, where it effectively locks the plate to the frame and remains in such position notwithstanding vibration of the supporting wall, which naturally results in an automobile or airplane, for instance.

I claim:

A fastening device of the character described comprising a rotatable stud having a head and a flat sided shank and a sheet metal bar formed with two longitudinally spaced openings through it and a longitudinal slit connecting said openings to leave two short tongues of greater width than the shank, said tongues being bent at acute angles to the body of the bar at the long sides of the slit and adapted to engage the opposite flat sides of the shank, whereby the bar may automatically lock itself to the shank, so that rotation of the stud may correspondingly turn the bar.

GEORGE A. TINNERMAN.